(12) United States Patent
Black (10) Patent No.: US 12,356,534 B2
(45) Date of Patent: Jul. 8, 2025

(54) PORTABLE FOOD PREPARATION ASSEMBLY (71) Applicant: Gerry Black, Ulysses, KS (US)

(72) Inventor: Gerry Black, Ulysses, KS (US)

(*) Notice: Subject to any disclaimer, the term of this patent is extended or adjusted under 35 U.S.C. 154(b) by 823 days.

(21) Appl. No.: 17/582,713

(22) Filed: Jan. 24, 2022

(65) Prior Publication Data
US 2023/0239975 A1 Jul. 27, 2023

(51) Int. Cl.
H05B 6/80 (2006.01)
A45C 11/20 (2006.01)
A45C 13/02 (2006.01)
A45C 15/00 (2006.01)
A47J 36/06 (2006.01)
A47J 36/24 (2006.01)
H01M 10/48 (2006.01)
H01M 50/247 (2021.01)
H05B 6/64 (2006.01)

(52) U.S. Cl.
CPC .............. *H05B 6/80* (2013.01); *A45C 11/20* (2013.01); *A45C 13/02* (2013.01); *A45C 15/00* (2013.01); *A47J 36/06* (2013.01); *A47J 36/2483* (2013.01); *H01M 10/488* (2013.01); *H01M 50/247* (2021.01); *H05B 6/6414* (2013.01); *H05B 6/6435* (2013.01); *H01M 2220/30* (2013.01)

(58) Field of Classification Search
CPC ........ A47J 36/06; A47J 36/24; A47J 36/2433; A47J 36/2438; A47J 36/2483; A45C 11/20; A45C 15/00; A45C 13/02; H01M 50/247; H01M 50/267; H01M 10/488; H01M 2220/30; H05B 6/6402; H05B 6/6414; H05B 6/6426; H05B 6/6435; H05B 6/687; H05B 6/80

See application file for complete search history.

(56) References Cited

U.S. PATENT DOCUMENTS

| | | | |
|---|---|---|---|
| 4,420,670 A | 12/1983 | Kalb | |
| 4,866,572 A | 9/1989 | Blodgett | |
| 5,315,084 A * | 5/1994 | Jensen | F25D 23/12 219/710 |
| 5,369,255 A | 11/1994 | Sherer | |
| 6,153,857 A * | 11/2000 | Gunnels | A47J 37/0713 126/29 |
| D443,171 S * | 6/2001 | Chen | D7/350.4 |
| D606,799 S | 12/2009 | Saunders | |
| 8,405,010 B2 * | 3/2013 | Van Dyke | H05B 6/6426 219/757 |
| 2007/0024237 A1* | 2/2007 | Cole, Jr. | A45C 15/00 320/107 |
| 2008/0190914 A1 | 8/2008 | Gibson | |
| 2008/0217327 A1 | 9/2008 | Herrera | |
| 2013/0082044 A1* | 4/2013 | Doan | H05B 6/80 219/387 |
| 2020/0092956 A1 | 3/2020 | Viet-Doan | |

FOREIGN PATENT DOCUMENTS

WO  WO2020056262  3/2020

* cited by examiner

Primary Examiner — Hung D Nguyen (57) ABSTRACT

A portable food preparation assembly for storing and subsequently cooking food items includes a lunchbox that has a first compartment and a second compartment. The first compartment is defined by a thermally insulating material to store food items and ice for cooling the food items. A microwave oven is integrated into the lunchbox for directing microwave energy into the second compartment to cook food items positioned in the second compartment.

8 Claims, 7 Drawing Sheets

PORTABLE FOOD PREPARATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to food preparation devices and more particularly pertains to a new food preparation device for storing and subsequently cooking food items.

(2) Description of Related Art Including Information Disclosed Under 37 CFR 1.97 and 1.98

The prior art relates to food preparation devices including a variety of lunch box devices that has a first compartment in a storage portion and a second compartment in a lid portion. The prior art discloses a modular food preparation device that includes an ice chest that is attachable to a microwave oven. The prior art discloses a variety of lunchbox devices that includes an ice chest and a microwave oven that is integrated into an outer wall of the ice chest. The prior art discloses a variety of portable microwave oven devices.

BRIEF SUMMARY OF THE INVENTION

An embodiment of the disclosure meets the needs presented above by generally comprising a lunchbox that has a first compartment and a second compartment. The first compartment is defined by a thermally insulating material to store food items and ice for cooling the food items. A microwave oven is integrated into the lunchbox for directing microwave energy into the second compartment to cook food items positioned in the second compartment.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
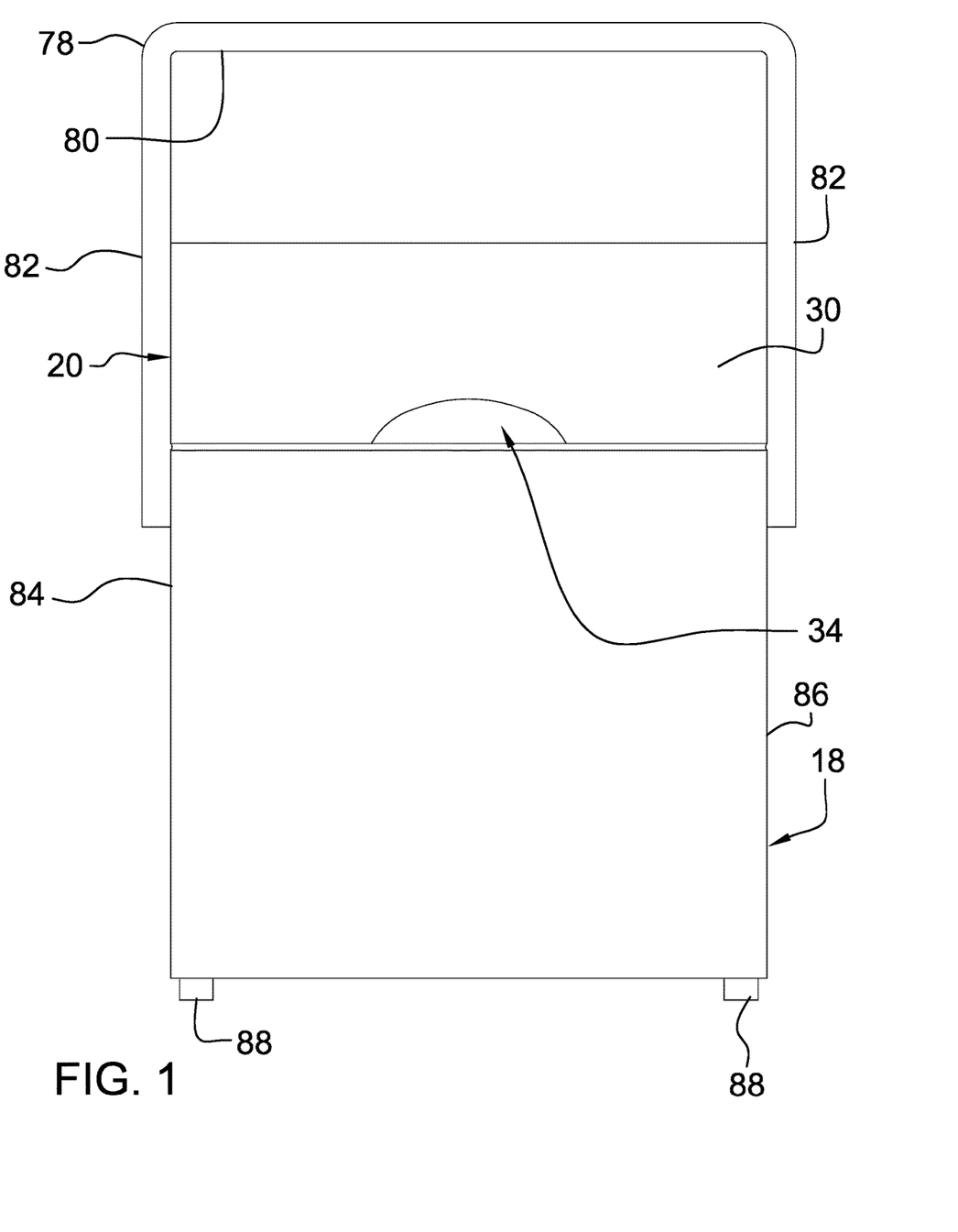
FIG. 1 is a front view of a portable food preparation assembly according to an embodiment of the disclosure.
Figure 2:
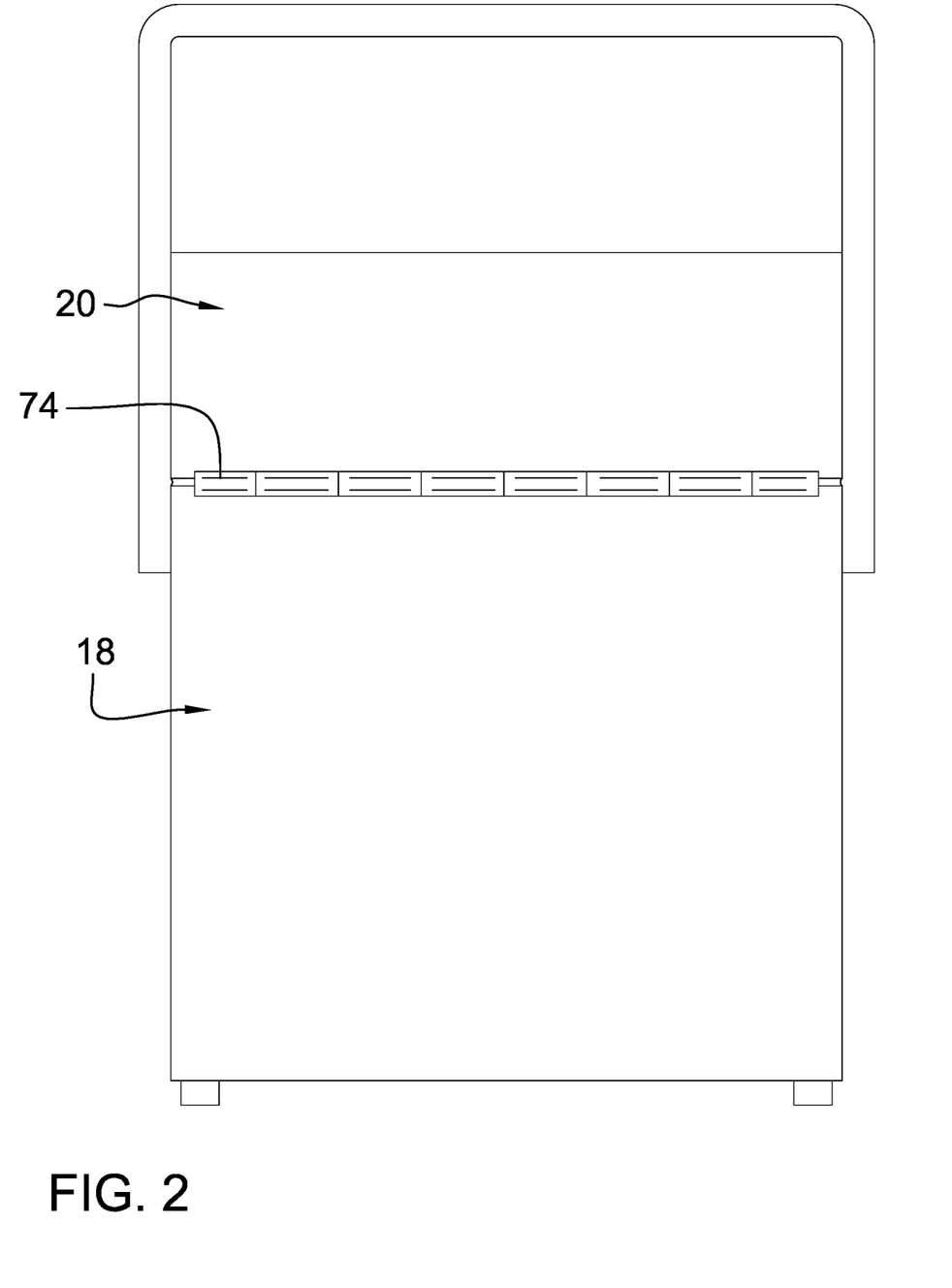
FIG. 2 is a back view of an embodiment of the disclosure.
Figure 3:
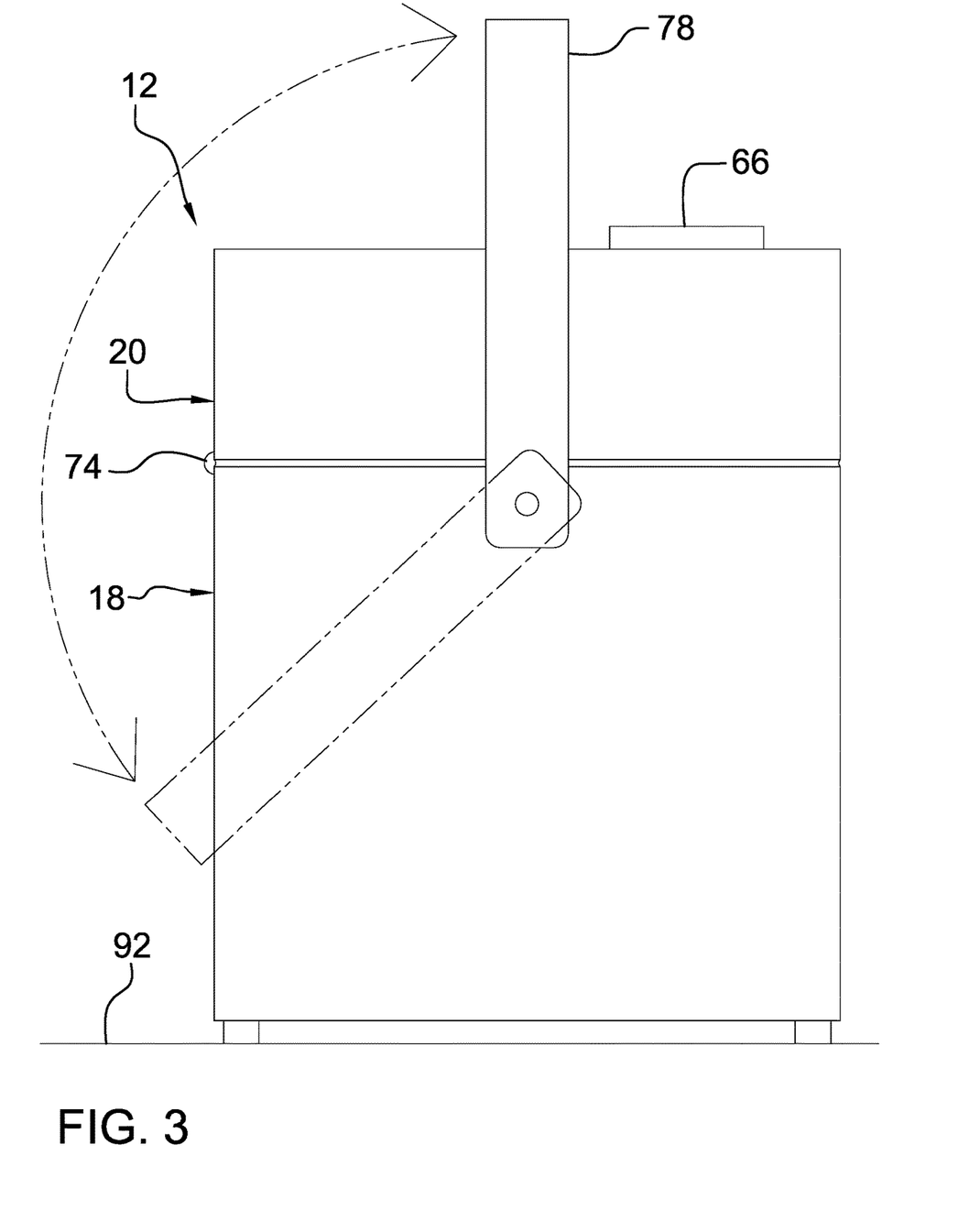
FIG. 3 is a left side view of an embodiment of the disclosure.
Figure 4:
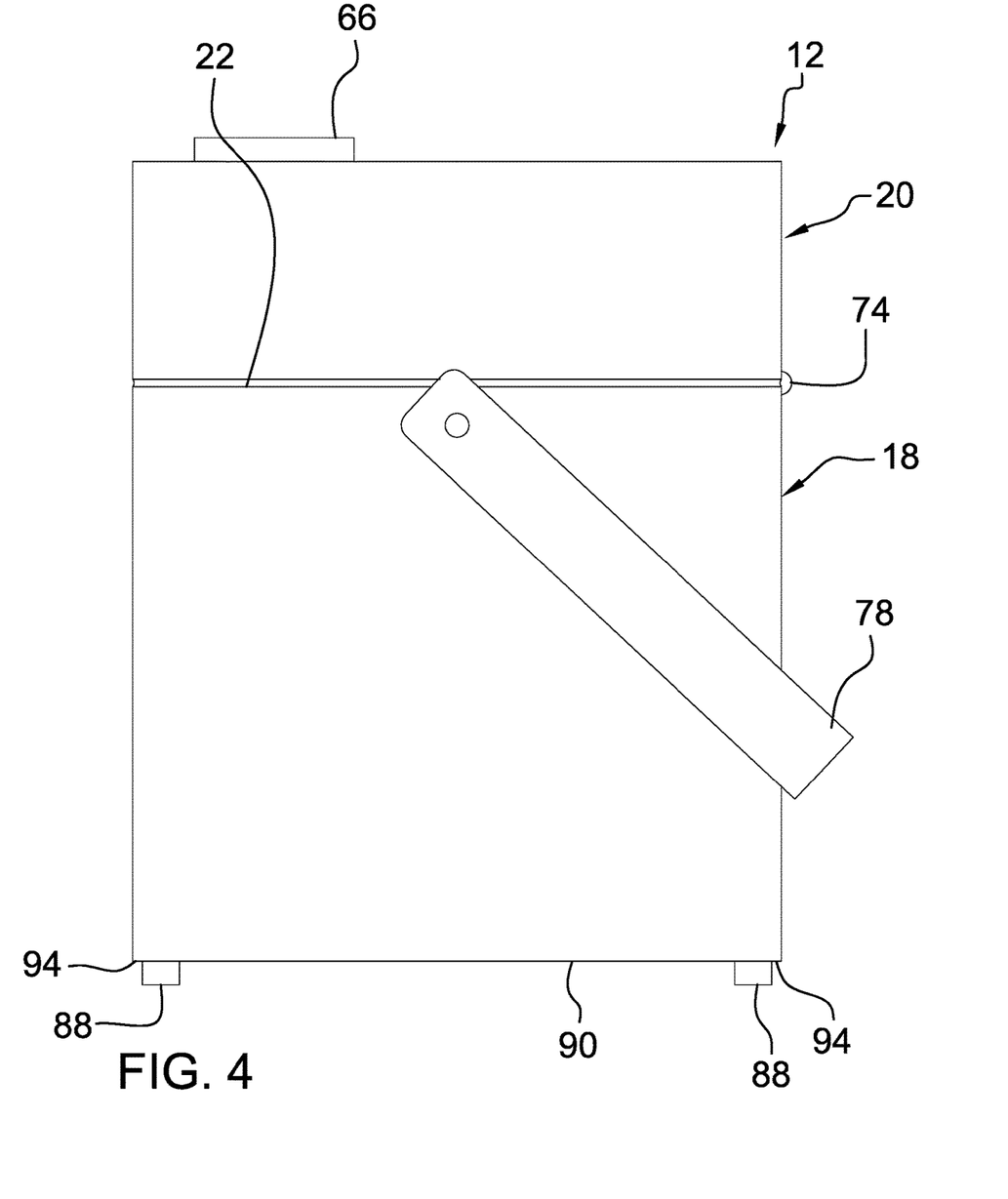
FIG. 4 is a right side view of an embodiment of the disclosure.
Figure 5:
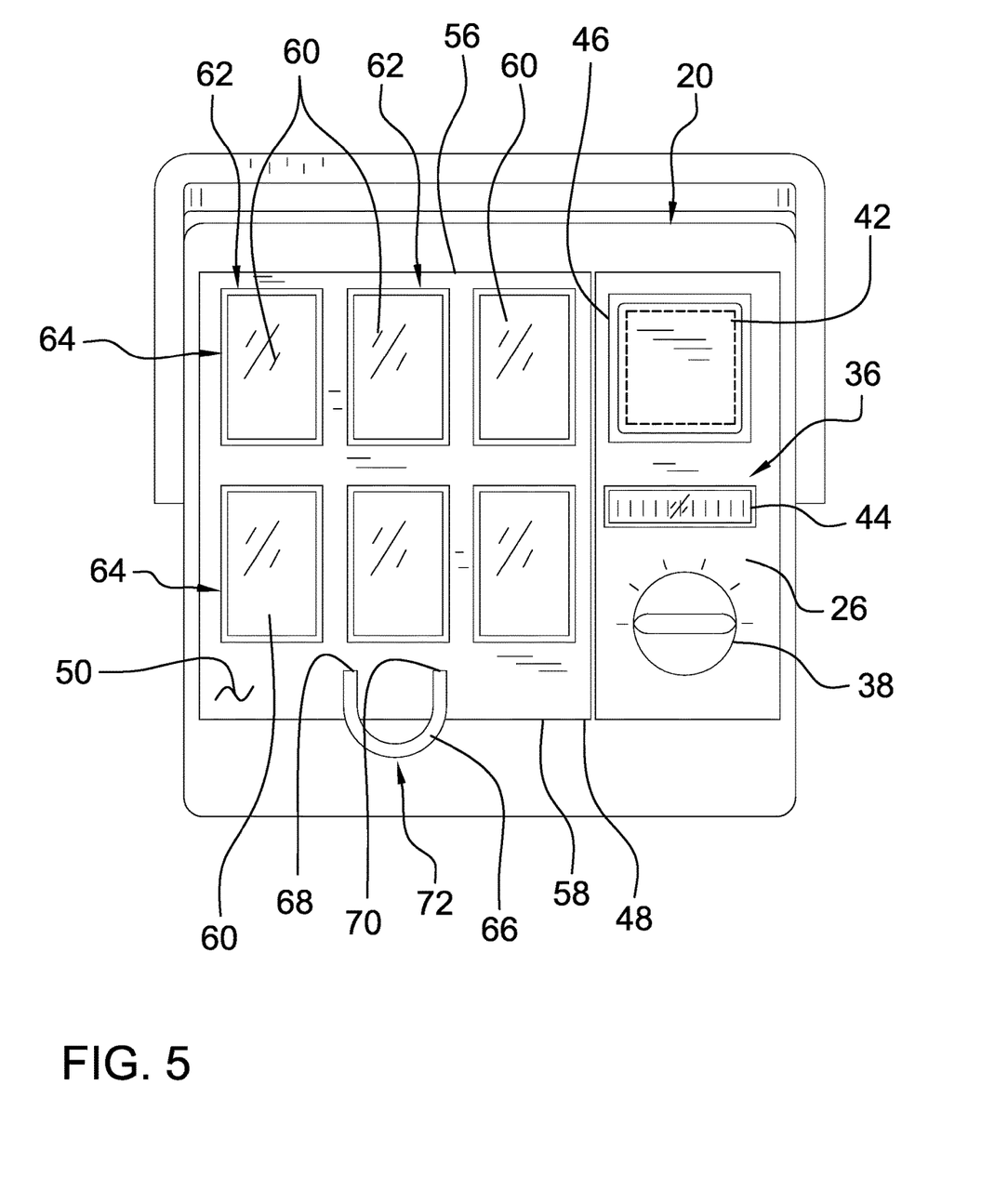
FIG. 5 is a top side view of an embodiment of the disclosure.
Figure 6:
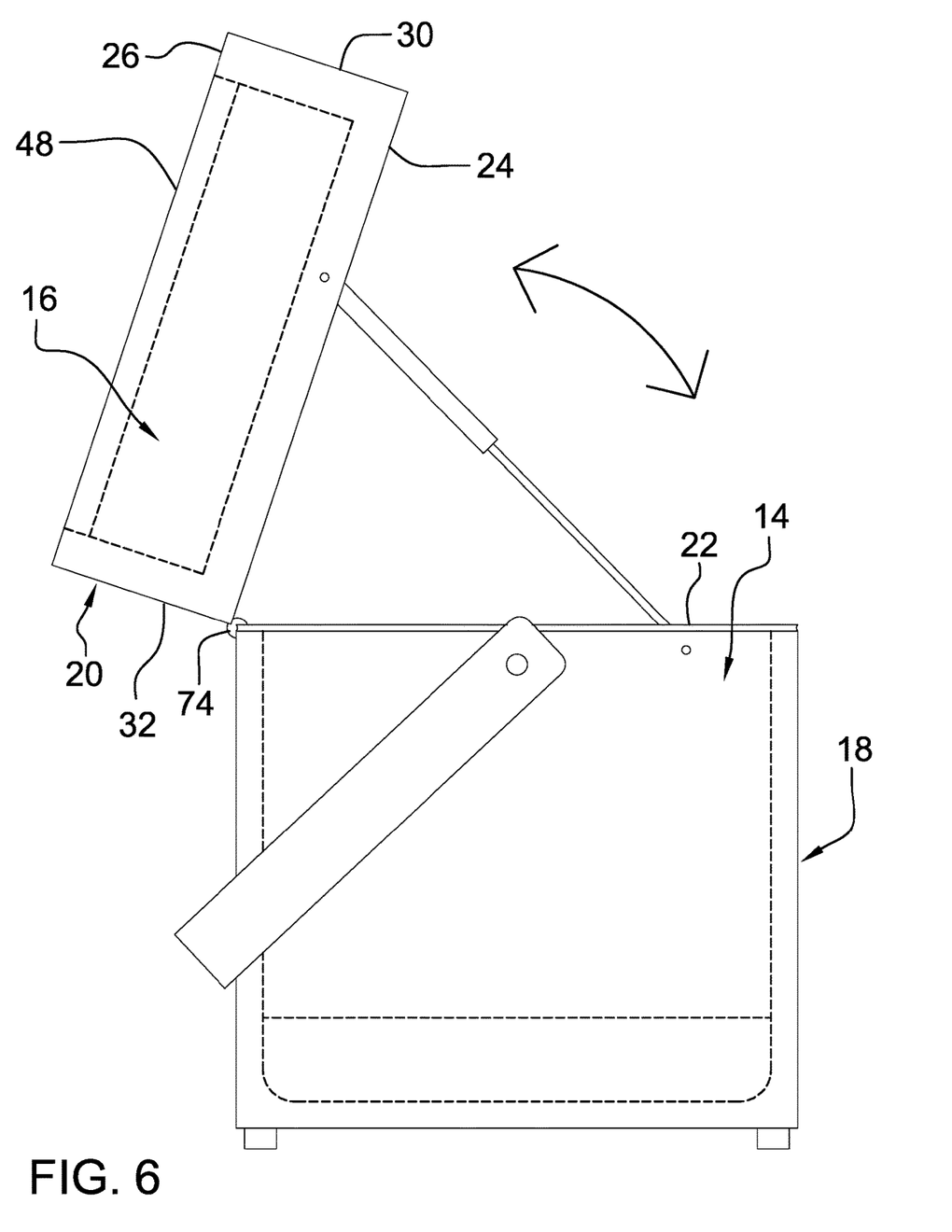
FIG. 6 is a right side phantom in-use view of an embodiment of the disclosure.
Figure 7:
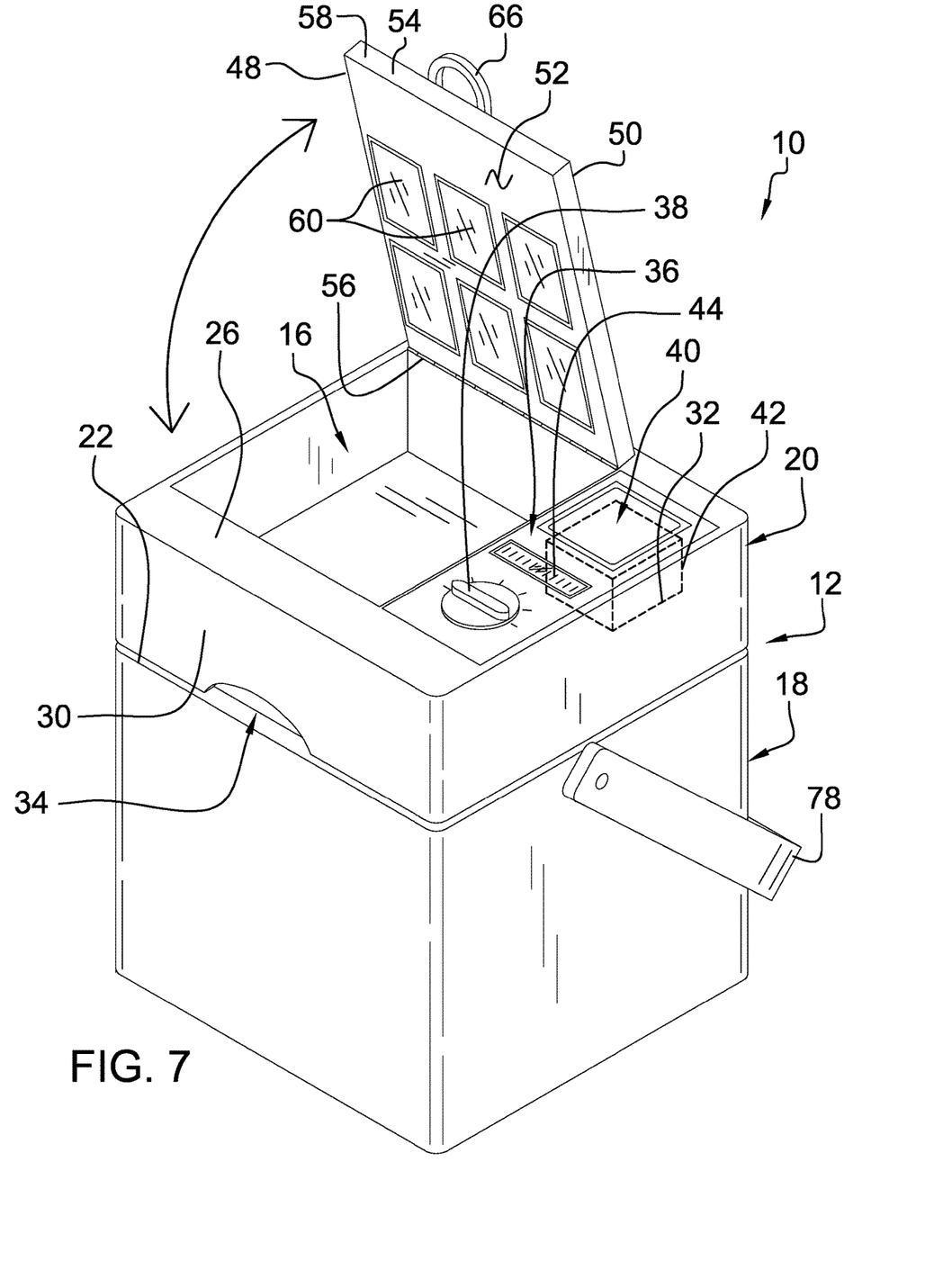
FIG. 7 is a top perspective in-use view of an embodiment of the disclosure.

With reference now to the drawings, and in particular to FIGS. 1 through 7 thereof, a new food preparation device embodying the principles and concepts of an embodiment of the disclosure and generally designated by the reference numeral 10 will be described.

As best illustrated in FIGS. 1 through 7, the portable food preparation assembly 10 generally comprises a lunchbox 12 that has a first compartment 14 and a second compartment 16. The first compartment 14 is defined by a thermally insulating material for storing food items and ice to cool the food items. The lunchbox 12 has a storage portion 18 and a lid portion 20; the first compartment 14 is integrated into the storage portion 18 and the second compartment 16 is integrated into the lid portion 20. The storage portion 18 has a top side 22 and the first compartment 14 extends through the top side 22 to access the first compartment 14.

The lid portion 20 has a lower side 24, an upper side 26, a rear side 28 and a front side 30. The second compartment 16 extends through the upper side 26 to access the second compartment 16. The upper side 26 has a battery well 32 extending toward the lower side 24. The lid portion 20 is positionable in a closed position having the lower side 24 resting on the top side 22 of the storage portion 18. Conversely, the lid portion 20 is positionable in an open position having the top side 22 being exposed for accessing the first compartment 14. The lid portion 20 has a grip recess 34 extending into an intersection between the front side 30 and the lower side 24 of the lid portion 20 to facilitate the lid portion 20 to be gripped for opening when the lid portion 20 is in the closed position. Additionally, the grip recess 34 is centrally positioned along the intersection.

A microwave oven 36 is integrated into the lunchbox 12 and the microwave oven 36 is aligned with the second compartment 16 for directing microwave energy into the second compartment 16. In this way the microwave oven 36 can cook food items positioned in the second compartment 16. The microwave oven 36 is integrated into the lid portion 20 and microwave oven 36 may include an emitter and other conventional circuitry associated with conventional microwave ovens. The microwave oven 36 includes a control knob 38 that is rotatably disposed on the upper side 26 of the lid portion 20. The control knob 38 is positionable between a minimum time and a maximum time for actuating the microwave oven 36 for a selected duration of time.

The microwave oven 36 includes a power supply 40 is integrated into the lid portion 20 and the power supply 40 is electrically coupled to the microwave oven 36. The power supply 40 comprises a rechargeable battery 42 that is removably positioned in the battery well 32 in the upper side 26 of the lid portion 20. The rechargeable battery 42 is electrically coupled to the microwave oven 36. The power supply 40 includes a charge meter 44 that is coupled to the upper side 26 of the lid portion 20 and the charge meter 44 is electrically coupled to the rechargeable battery 42. The charge meter 44 displays indicia ranging between a minimum signal and a maximum signal for displaying a charge level of the rechargeable battery 42. A battery cover 46 is removably engaged to the upper side 26 of the lid portion 20 and the battery cover 46 is aligned with the battery well 32 for retaining the rechargeable battery 42 in the battery well 32.

A door 48 is hingedly coupled to the lid portion 20 and the door 48 has an upper surface 50, a lower surface 52 and a perimeter edge 54 extending between the upper surface 50 and the lower surface 52. The perimeter edge 54 has a rear side 56 and a front side 58, and the rear side 56 of the perimeter edge 54 is hingedly coupled to the upper side 26 of the lid portion 20 having the door 48 being aligned with the second compartment 16. The door 48 closes the second compartment 16 when the door 48 is closed and the door 48 exposes the second compartment 16 when the door 48 is opened.

The door 48 has a plurality of windows 60 each extending through the upper surface 50 and the lower surface 52 of the door 48 to facilitate the food items in the second compartment 16 to be visible. The windows 60 are arranged into a plurality of columns 62 and rows 64 on the door 48. A catch 66 is coupled to and extends away from the front side 30 of the perimeter edge 54 of the door 48 for gripping to open and close the door 48. The catch 66 has a first end 68 and a second end 70, and the catch 66 is curved between the first end 68 and the second end 70. The catch 66 lies flat on the upper side 26 of the lid portion 20 having a curve 72 of the catch 66 spaced from the front side 30 of the perimeter edge 54 and having each of the first end 68 and the second end 70 positioned on the upper side 26.

A hinge 74 is hingedly coupled between the rear side 28 of the lid portion 20 and the top side 22 of the storage portion 18 for hingedly retaining the lid portion 20 on the storage portion 18. The hinge 74 is elongated to extend along a substantial length of the rear side 28 of the lid portion 20. A pair of struts 76 is provided and each of the struts 76 extends between the top side 22 of the storage portion 18 and the lower side 24 of the lid portion 20. Each of the struts 76 is biased into an elongated position for urging the lid portion 20 into the open position and each of the struts 76 is compressible into a collapsed position for urging the lid portion 20 into the closed position. Each of the struts 76 may comprise a gas charged piston or other type of compressible strut.

A handle 78 is pivotally disposed on the lunchbox 12 for facilitating the lunchbox 12 to be carried. The handle 78 has a central portion 80 extending between a pair of end portions 82, and each of the end portions 82 is pivotally coupled to a respective first lateral side 84 and second lateral side 86 of the storage portion 18 such that the central portion 80 can be gripped. A plurality of feet 88 is each coupled to and extends downwardly from a bottom side 90 of the storage portion 18 to support the storage portion 18 over a support surface 92. Each of the feet 88 is aligned with a respective one of four corners 94 of the bottom side 90.

In use, the food items, such as meat, vegetables, beverages and other perishable food items, are stored in the first compartment 14 along with ice, if so desired. The lunchbox 12 is transported to a remote location, such as a construction site, a picnic site or other similar location. Selected food items can be placed in the second compartment 16 and the control knob 38 is set to a desired time to cook the food items in the second compartment 16. In this way a hot meal can be prepared in any location and at any time. The rechargeable battery 42 is removed from the battery well 32 and placed into a charger for recharging when the rechargeable battery 42 is depleted.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable food preparation assembly for storing and subsequently cooking food items, said assembly comprising:
   a lunchbox having a first compartment and a second compartment, said first compartment being defined by a thermally insulating material wherein said first compartment is configured to store food items and ice for cooling the food items; and
   a microwave oven being integrated into said lunchbox, said microwave oven being aligned with said second compartment for directing microwave energy into said second compartment wherein said microwave oven is configured to cook food items positioned in said second compartment, said microwave oven being integrated into a lid portion of said lunchbox.

2. The assembly according to claim 1, wherein:
   said lunchbox has a storage portion, said first compartment being integrated into said storage portion, said second compartment being integrated into said lid portion;
   said storage portion has a top side, said first compartment extending through said top side to access said first compartment;

said lid portion has a lower side, an upper side, a rear side and a front side, said second compartment extending through said upper side to access said second compartment;

said upper side has a battery well extending toward said lower side;

said lid portion is positionable in a closed position having said lower side resting on said top side of said storage portion, said lid portion being positionable in an open position having said top side being exposed for accessing said first compartment; and said lid portion has a grip recess extending into an intersection between said front side and said lower side of said lid portion wherein said grip recess is configured to facilitate said lid portion to be gripped for opening when said lid portion is in said closed position, said grip recess being centrally positioned along said intersection.

3. The assembly according to claim 2, wherein said microwave oven includes:

a control knob being rotatably disposed on said upper side of said lid portion, said control knob being positionable between a minimum time and a maximum time for actuating said microwave oven for a selected duration of time;

a power supply being integrated into said lid portion, said power supply being electrically coupled to said microwave oven, said power supply comprising:

a rechargeable battery being removably positioned in said battery well in said upper side of said lid portion, said rechargeable battery being electrically coupled to said microwave oven; and a charge meter being coupled to said upper side of said lid portion, said charge meter being electrically coupled to said rechargeable battery, said charge meter displaying indicia ranging between a minimum signal and a maximum signal for displaying a charge level of said rechargeable battery; and a battery cover being removably engaged to said upper side of said lid portion, said battery cover being aligned with said battery well for retaining said rechargeable battery in said battery well.

4. The assembly according to claim 2, further comprising a door being hingedly coupled to said lid portion for opening and closing said second compartment, said door having an upper surface, a lower surface and a perimeter edge extending between said upper surface and said lower surface, said perimeter edge having a rear side and a front side, said rear side being hingedly coupled to said upper side of said lid portion having said door being aligned with said second compartment, said door closing said second compartment when said door is closed, said door exposing said second compartment when said door is opened.

5. The assembly according to claim 4, wherein said door has a plurality of windows each extending through said upper surface and said lower surface of said door wherein said windows are configured to facilitate the food items in said second compartment to be visible, said windows being arranged into a plurality of columns and rows on said door.

6. The assembly according to claim 4, further comprising a catch being coupled to and extending away from said front side of said perimeter edge of said door wherein said catch is configured to be gripped for opening and closing said door, said catch has a first end and a second end, said catch being curved between said first end and said second end, said catch lying flat on said upper side of said lid portion having a curve of said catch being spaced from said front side of said perimeter edge and having each of said first end and said second end being positioned on said upper side.

7. The assembly according to claim 2, further comprising:

a hinge being hingedly coupled between said rear side of said lid portion and said top side of said storage portion for hingedly retaining said lid portion on said storage portion, said hinge being elongated to extend along a substantial length of said rear side of said lid portion; and a pair of struts, each of said struts extending between said top side of said storage portion and said lower side of said lid portion, each of said struts being biased into an elongated position for urging said lid portion into said open position, each of said struts being compressible into a collapsed position for urging said lid into said closed position.

8. A portable food preparation assembly for storing and subsequently cooking food items, said assembly comprising:

a lunchbox having a first compartment and a second compartment, said first compartment being defined by a thermally insulating material wherein said first compartment is configured to store food items and ice for cooling the food items, said lunchbox having a storage portion and a lid portion, said first compartment being integrated into said storage portion, said second compartment being integrated into said lid portion, said storage portion having a top side, said first compartment extending through said top side to access said first compartment, said lid portion having a lower side, an upper side, a rear side and a front side, said second compartment extending through said upper side to access said second compartment, said upper side having a battery well extending toward said lower side, said lid portion being positionable in a closed position having said lower side resting on said top side of said storage portion, said lid portion being positionable in an open position having said top side being exposed for accessing said first compartment, said lid portion having a grip recess extending into an intersection between said front side and said lower side of said lid portion wherein said grip recess is configured to facilitate said lid portion to be gripped for opening when said lid portion is in said closed position, said grip recess being centrally positioned along said intersection;

a microwave oven being integrated into said lunchbox, said microwave oven being aligned with said second compartment for directing microwave energy into said second compartment wherein said microwave oven is configured to cook food items positioned in said second compartment, said microwave oven being integrated into said lid portion, said microwave oven including:

a control knob being rotatably disposed on said upper side of said lid portion, said control knob being positionable between a minimum time and a maximum time for actuating said microwave oven for a selected duration of time; and a power supply being integrated into said lid portion, said power supply being electrically coupled to said microwave oven, said power supply comprising:

a rechargeable battery being removably positioned in said battery well in said upper side of said lid portion, said rechargeable battery being electrically coupled to said microwave oven; and a charge meter being coupled to said upper side of said lid portion, said charge meter being electrically coupled to said rechargeable battery, said charge meter displaying indicia ranging between a minimum signal and a maximum signal for displaying a charge level of said rechargeable battery;

a door being hingedly coupled to said lid portion, said door having an upper surface, a lower surface and a perimeter edge extending between said upper surface and said lower surface, said perimeter edge having a rear side and a front side, said rear side being hingedly coupled to said upper side of said lid portion having said door being aligned with said second compartment, said door closing said second compartment when said door is closed, said door exposing said second compartment when said door is opened, said door having a plurality of windows each extending through said upper surface and said lower surface of said door wherein said windows are configured to facilitate the food items in said second compartment to be visible, said windows being arranged into a plurality of columns and rows on said door;

a catch being coupled to and extending away from said front side of said perimeter edge of said door wherein said catch is configured to be gripped for opening and closing said door, said catch having a first end and a second end, said catch being curved between said first end and said second end, said catch lying flat on said upper side of said lid portion having a curve of said catch being spaced from said front side of said perimeter edge and having each of said first end and said second end being positioned on said upper side;

a battery cover being removably engaged to said upper side of said lid portion, said battery cover being aligned with said battery well for retaining said rechargeable battery in said battery well;

a hinge being hingedly coupled between said rear side of said lid portion and said top side of said storage portion for hingedly retaining said lid portion on said storage portion, said hinge being elongated to extend along a substantial length of said rear side of said lid portion;

a pair of struts, each of said struts extending between said top side of said storage portion and said lower side of said lid portion, each of said struts being biased into an elongated position for urging said lid portion into said open position, each of said struts being compressible into a collapsed position for urging said lid into said closed position;

a handle being pivotally disposed on said lunchbox for facilitating said lunchbox to be carried, said handle having a central portion extending between a pair of end portions, each of said end portions being pivotally coupled to a respective first lateral side and second lateral side of said storage portion wherein said central portion is configured to be gripped; and a plurality of feet, each of said feet being coupled to and extending downwardly from a bottom side of said storage portion wherein each of said feet is configured to support said storage portion over a support surface, each of said feet being aligned with a respective one of four corners of said bottom side.

\* \* \* \* \*